W. E. TRIMLETT.
DOOR SEAT FOR AUTOMOBILES.
APPLICATION FILED MAR. 27, 1917.
1,254,550.
Patented Jan. 22, 1918.
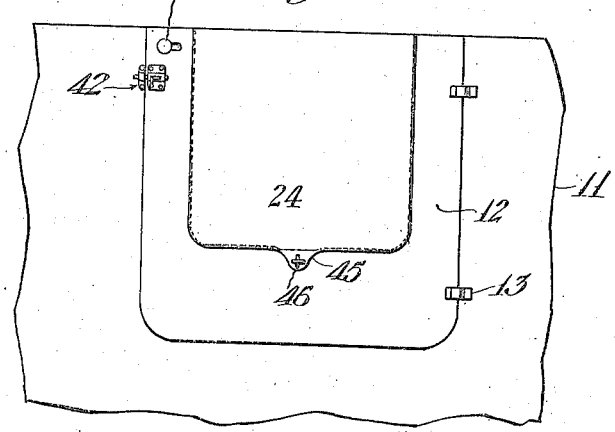
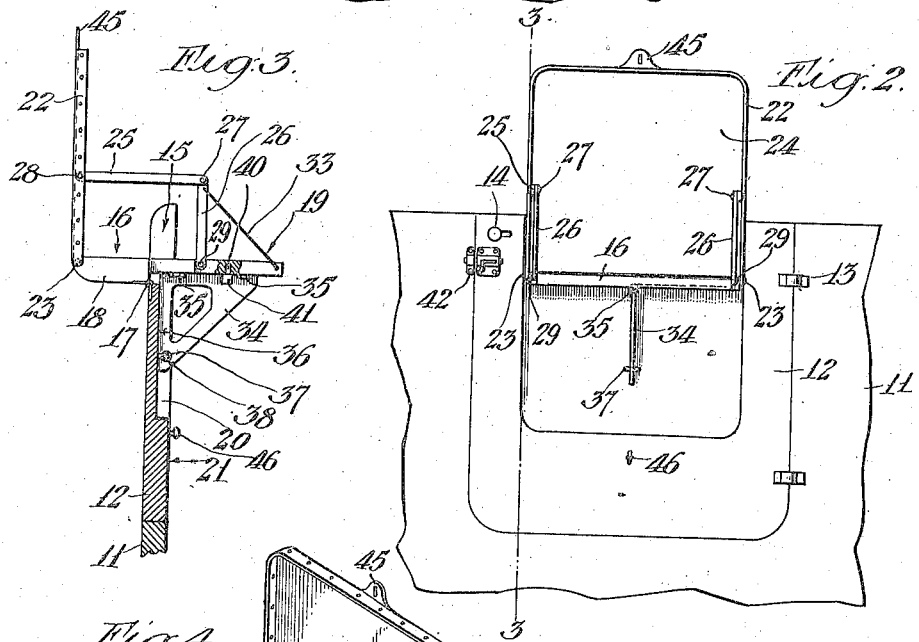
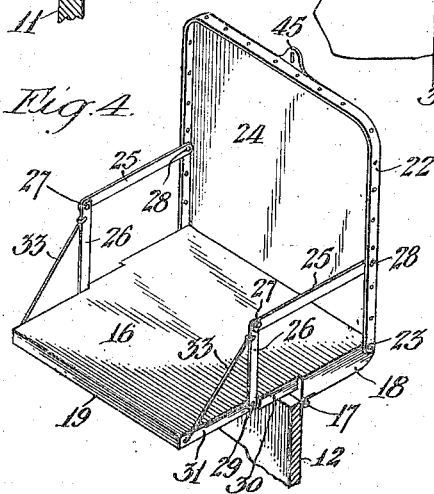
Inventor
William E. Trimlett
by Graham Harris
Attorneys

UNITED STATES PATENT OFFICE.

WILLIAM E. TRIMLETT, OF LOS ANGELES, CALIFORNIA.

DOOR-SEAT FOR AUTOMOBILES.

1,254,550.  Specification of Letters Patent.  Patented Jan. 22, 1918.

Application filed March 27, 1917.  Serial No. 157,825.

*To all whom it may concern:*

Be it known that I, WILLIAM E. TRIMLETT, a citizen of the United States, residing at Los Angeles, in the county of Los Angeles and State of California, have invented a new and useful Door-Seat for Automobiles, of which the following is a specification.

My invention relates to seats for automobiles and the like, and is more particularly a seat made as part of the door of the automobile, and the principal object of my invention is to make a seat of the class described of simple form and construction which can be folded into an inconspicuous, inoperative position when not in use. Other objects and advantages will appear hereinafter from the following description.

Referring to the drawings, which are for illustrative purposes only:

Figure 1 is an elevation of an automobile door looking from the inside of the automobile, the seat thereon being in inoperative or folded position.

Fig. 2 is a view similar to Fig. 1, the seat being in raised position.

Fig. 3 is a sectional view on line 3—3, Fig. 2.

Fig. 4 is a perspective view of the seat in operative position.

11 designates the automobile body, and 12 a common form of automobile door hinged at 13 to the body and having the usual form of latch 14. A portion of the upper part of the door, as indicated at 15, is cut out and a seat 16 is hinged at 17 in the cut out portion. The outer portion 18 of the seat is of the same thickness and shape as the portion of the door cut out, and when in closed position fills in the cut out portion of the door and completes the same. The inner portion 19 of the seat extends into the automobile, and when in closed position fits within a recess 20 formed in the inside face 21 of the door. The seat is provided with a back consisting of a frame 22 pivotally connected to the seat at 23 and having a back 24 of any suitable material, such as canvas, thereon, which, when the seat is in folded or closed position, is flush with the inside of the door and may be finished to correspond with the finish of the door. Arms are provided for the seat consisting of bars 25 and 26 pivotally connected together at 27, the bars 25 being pivotally connected to the back at 28, and the bars 26 being pivotally connected at 29 to the sides of the seat. The sides of the seat are cut back, as indicated at 30 and 31, the cut away portion 30 receiving the bars 25 when in closed position, and the portion 31 receiving the bars 26 when in closed position, so that the back 24 may fold against the seat when in closed position. The back of the seat may be prevented from moving too far outward by cords or chains 33 secured to the bars 26 and the seat 16.

The seat is supported in open position by means of a bracket 34 pivoted at 35 to the underside of the seat and bearing or resting against the door at 36, and when in such position retains the seat from swinging over the door by means of a hook 37 which enters a hole 38 in the bracket 34 when the same is swung into its supporting position. The seat 16 is provided with a recess 40, and the bracket 34 is cut away at 41 to accommodate the hook when the seat is folded.

An extra bolt 42 is provided for the door to prevent opening of the same when the seat is in use. It is to be noted that by cutting away a portion of the top of the door the height of the seat may be made substantially lower than if the seat was pivoted to the top of the door. This results in bringing the feet of the occupant to the floor of the automobile, and also allows more head room.

It is to be noted that when the seat is in closed position, as shown in Fig. 1, it is substantially a part of the door, and that when raised to open position, as shown in Figs. 2, 3 and 4, it forms a seat lower than the top of the door projecting outwardly from the door, as shown in Fig. 3. When in closed position, the seat is prevented from accidental displacement or movement by means of a tab or ear 45 secured to the back which is engaged by a turn-buckle 46 on the door.

I claim as my invention:—

1. In combination, a swinging door, and a seat pivotally supported on the door, said seat having a portion extending outwardly from the door and a portion extending inwardly therefrom.

2. In combination, a swinging door having a portion of the top cut out, and a seat pivotally mounted in said cut out portion of the door.

3. In combination, a swinging door having a portion of the top cut out, and a seat pivotally mounted in said cut out portion of the door, a portion of said seat being adapted to complete the cut out portion of the door when in closed position.

4. A seat for automobiles comprising a swinging door having a cut out portion at its top, a seat in said cut out portion pivotally attached to the door, said seat having an outwardly extending portion beyond the door and an inwardly extending portion within the door, said outwardly extending portion being adapted to fill the cut out portion of the door when in closed position, and said door having a recess to receive the inwardly extending portion of the seat when in closed position.

5. A seat for automobiles comprising a swinging door, a seat pivotally mounted thereon partially extending beyond the door, a back pivotally connected to the seat, means for folding the back against the seat, and means for supporting said seat in open position, said supporting means comprising a swinging bracket pivotally connected to the under side of said seat.

6. A seat for automobiles comprising a swinging door having a cut out portion at its top, a seat pivotally mounted on said door in the cut out portion, a portion of said seat completing the cut out portion of the door when the seat is in closed position, a back pivotally mounted on the seat, and means under said seat adapted to support the seat in open position and to prevent outward movement of the seat when in open position.

7. In combination with an automobile body having a cut out portion on its upper edge, a seat pivotally mounted in said cut out portion, and means for supporting said seat in open position.

In testimony whereof, I have hereunto set my hand at Los Angeles, California, this 16th day of March, 1917.

WILLIAM E. TRIMLETT.

Copies of this patent may be obtained for five cents each, by addressing the "Commissioner of Patents, Washington, D. C."